(12) United States Patent  
Gallo

(10) Patent No.: US 7,647,726 B2  
(45) Date of Patent: Jan. 19, 2010

(54) COVER FOR PLANT GROWING MEDIUM

(76) Inventor: Steven William Gallo, 2170 Rue Gauthier, Suite A, Montréal, Quebec (CA) H2K 1B1

( * ) Notice: Subject to any disclaimer, the term of this patent is extended or adjusted under 35 U.S.C. 154(b) by 0 days.

(21) Appl. No.: 11/784,072

(22) Filed: Apr. 5, 2007

(65) Prior Publication Data

US 2008/0244967 A1 Oct. 9, 2008

(51) Int. Cl.
*A01G 13/02* (2006.01)
*A01G 25/00* (2006.01)
*A47G 7/08* (2006.01)
(52) U.S. Cl. .......................... 47/31.1; 47/21.1; 47/30
(58) Field of Classification Search ................. 47/21.1, 47/30, 31.1, 32, 20.1, 65.6, 25.1, 29.5
See application file for complete search history.

(56) References Cited

U.S. PATENT DOCUMENTS

| 80,012 | A | * | 7/1868 | Robbins ................... 47/32 |
| 223,892 | A | * | 1/1880 | Delany .................... 47/32 |
| 2,614,727 | A | * | 10/1952 | Robinson ............... 220/780 |
| 2,893,168 | A | * | 7/1959 | Kobs ..................... 47/73 |
| 3,678,619 | A | | 7/1972 | Carlson |
| 4,395,845 | A | | 8/1983 | Markowitz |
| 4,786,308 | A | * | 11/1988 | Colling .................... 71/24 |
| 4,794,728 | A | | 1/1989 | Tsukada et al. |
| 4,850,134 | A | | 7/1989 | Snekkenes |
| 4,995,192 | A | | 2/1991 | DeWild |
| 6,135,057 | A | * | 10/2000 | Cummings .............. 119/165 |
| 6,578,316 | B2 | * | 6/2003 | Temple et al. ............ 47/29.5 |
| 7,013,597 | B1 | | 3/2006 | Dominguez |
| 2002/0189161 | A1 | * | 12/2002 | Rice ..................... 47/20.1 |

FOREIGN PATENT DOCUMENTS

WO PCT/CA2008/000621 7/2008

OTHER PUBLICATIONS

Printout from the Sunleaves Garden Products web-site located at the URL http://www.sunleaves.com (Accessed May 17, 2007).
Printout from the Hydrofarm web-site located at the URL http://www.hydrofarm.com (Accessed May 17, 2007).
Ontario Ministry of Agriculture Factsheet, "Fungus Gnats and Shoreflies in Greenhouse Crops" (Aug. 2006).
Lubomira Burchardt & Ewa Dankowska, "Development of algae on artificial substrates used for plant cultivation" (2003) 40:1 Biological Letters 53.
inews (Canada, Apr. 2008)—advertisement by Grodan.
Website printout, User forum discussion, www.rollitup.org, dated Feb. 2007.

(Continued)

*Primary Examiner*—Michael R Mansen
*Assistant Examiner*—Monica L Williams
(74) *Attorney, Agent, or Firm*—Daniel B. Schein, Esq.

(57) ABSTRACT

The present invention relates to a device for covering a plant growing medium. The device includes a sheet that defines an aperture. One or more protrusions extends from the sheet to engage a top surface of the plant growing medium. A wall is integrally attached to each edge of the sheet. Each wall has a series of ridges.

26 Claims, 3 Drawing Sheets

OTHER PUBLICATIONS

Website printout from http://www.hhydro.com/cgi-bin/hhydro/hh01018.html?id=xti6yuwd, displaying Sunleaves block cover, 2007.
Excerpt from Practical Hydroponics & Greenhouses magazine (Australia, Jul./Aug. 2008).
Excerpt from Treating Yourself—The alternative medicine journal (Canada, Winter 2008) p. 150.
Excerpt from FloraCulture International magazine (Dec. 2008) p. 21.
Excerpt from High Times magazine (U.S., Sep. 2008) p. 58.
Excerpt from inews magazine (Canada, Oct. 2008) p. 36.
Excerpt from Practical Hydroponics & Greenhouses magazine (Australia, May/Jun. 2008) pp. 10 and 53.
Excerpt from Groenten & Fruit magazine (Netherlands, Oct. 2008).
Excerpt from Groenten & Fruit magazine (Netherlands, Mar. 2009).
Excerpt from Maximum Yield magazine (Canada, Mar./Apr. 2008) p. 24.
Excerpt from inews magazine (Canada. Feb. 2008) pp. 60 and 62.
Excerpt from inews magazine (Canada, Jul. 2008) p. 33.
Advertisement in trade publication, (UK, 2008) p. 35.
Advertisement from Spannabis Magazine, (Spain, 2008).
Listing of CubeCap in catalog, (Switzerland, 2008).
Advertisement in Le Jardinier magazine (Canada, Sep./Oct. 2007).
Product announcement in Indoor Gardener magazine (Jul./Aug. 2008) pp. 26-27.
Advertisement Indoor Gardener magazine (Sep./Oct. 2007).
Advertisement Indoor Gardener magazine (Sep./Oct. 2008) p. 36.
Listing in Maximum Yield Trade Directory (Canada, 2009) pp. 63, 89, 105, 129 and 141.
Reference in Indoor Gardener magazine (Nov./Dec. 2007) p. 46.
Reference in Le Jardinier magazine (Nov./Dec. 2007) p. 4.
Printout from the Rockwool/Grodan Group web-site located at the URL http:/www.hydroponics101.com (Accessed Feb. 5, 2008).

* cited by examiner

COVER FOR PLANT GROWING MEDIUM

FIELD OF INVENTION

The present invention relates to a device for covering a plant growing medium.

BACKGROUND OF INVENTION

There are a number of situations in which it may be desirable to cultivate plants without having to use soil. For example, during the colder months of the year, some gardeners begin growing seedlings indoors in anticipation of spring. This process is more simple and sanitary when soil is not used.

Growing mediums other than soil may be used to germinate seeds. One popular growing medium is rockwool. Rockwool is used extensively for hydroponic growing systems. Rockwool is made by melting a combination of rock and sand and spinning the mixture. This results in fibres that may be formed into different shapes and sizes.

Rockwool absorbs and maintains water. Further, rockwool is porous and thus retains oxygen. As a result, plants that grow in rockwool have healthy root systems. Finally, rockwool can be formed into a number of shapes and sizes. Frequently, rockwool fibres are compressed into cubes.

Before using a rockwool cube, the cube must be treated by soaking it in a nutrient solution to adjust its pH level. Further, once seeds or seedlings are placed in rockwool, the rockwool is periodically watered. Therefore, rockwool is moist when in use.

The moisture of rockwool cubes creates some difficulties for gardeners. Specifically, when rockwool is exposed to the light that is normally used for indoor germination and cultivation of plants, algae forms on the surface of the moist rockwool cubes. Such algae attracts insects such as fungus gnats and shoreflies. Further, when algae decays and dies, it can become detrimental to plants since it may invite bacteria and viruses. Algae can even compete with the plants being grown for oxygen, which is necessary for nutrient uptake.

To prevent the growth of algae on rockwool, it is necessary to deprive the algae of light. Algae flourishes in wet, well lit locations and depriving it of light prevents photosynthesis.

Various solutions have been proposed for covering rockwool cubes to prevent the growth of algae. However, previously disclosed rockwool cube covers suffer from a number of disadvantages. First, such covers limit the circulation of oxygen, thus creating an anaerobic environment. This inhibits nutrient uptake by the plant. Further, some previously disclosed cube covers are simply sheets of plastic that are placed above the cube and frequently engage the surface of the cube, thus further inhibiting the circulation of oxygen. Finally, previously disclosed cube covers are not durable.

SUMMARY OF INVENTION

An object of the invention is to provide an improved cube cover for use with plant growing mediums.

Accordingly, the invention herein comprises a device for covering a plant growing medium comprising a sheet. The sheet defines an aperture. Further, the sheet has at least one protrusion projecting from the sheet for engaging a top surface of the plant growing medium.

Descriptive references herein such as "planar", "parallel", "perpendicular", "normal", "straight", "horizontal" or "vertical" are for convenience of description only. It will be appreciated by one skilled in the art that the placement of elements may depart moderately from a planar, parallel, perpendicular, normal, straight, horizontal or vertical configuration.

BRIEF DESCRIPTION OF THE DRAWINGS

In drawings which illustrate by way of example only a preferred embodiment of the invention.

DETAILED DESCRIPTION OF THE PREFERRED EMBODIMENTS

Figure 1:
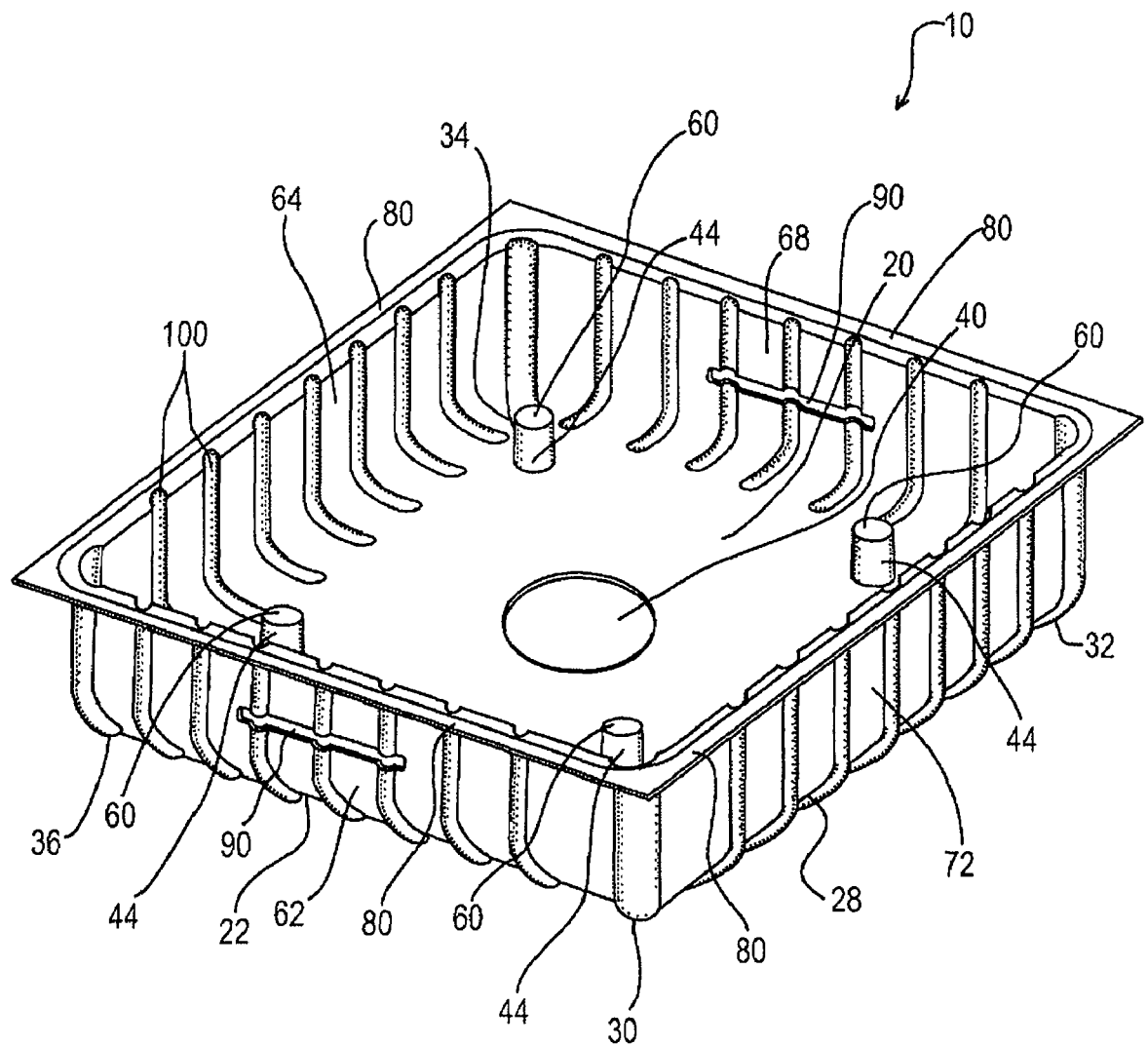
FIG. 1 is a perspective view of a bottom surface of the cube cover.
Figure 2:
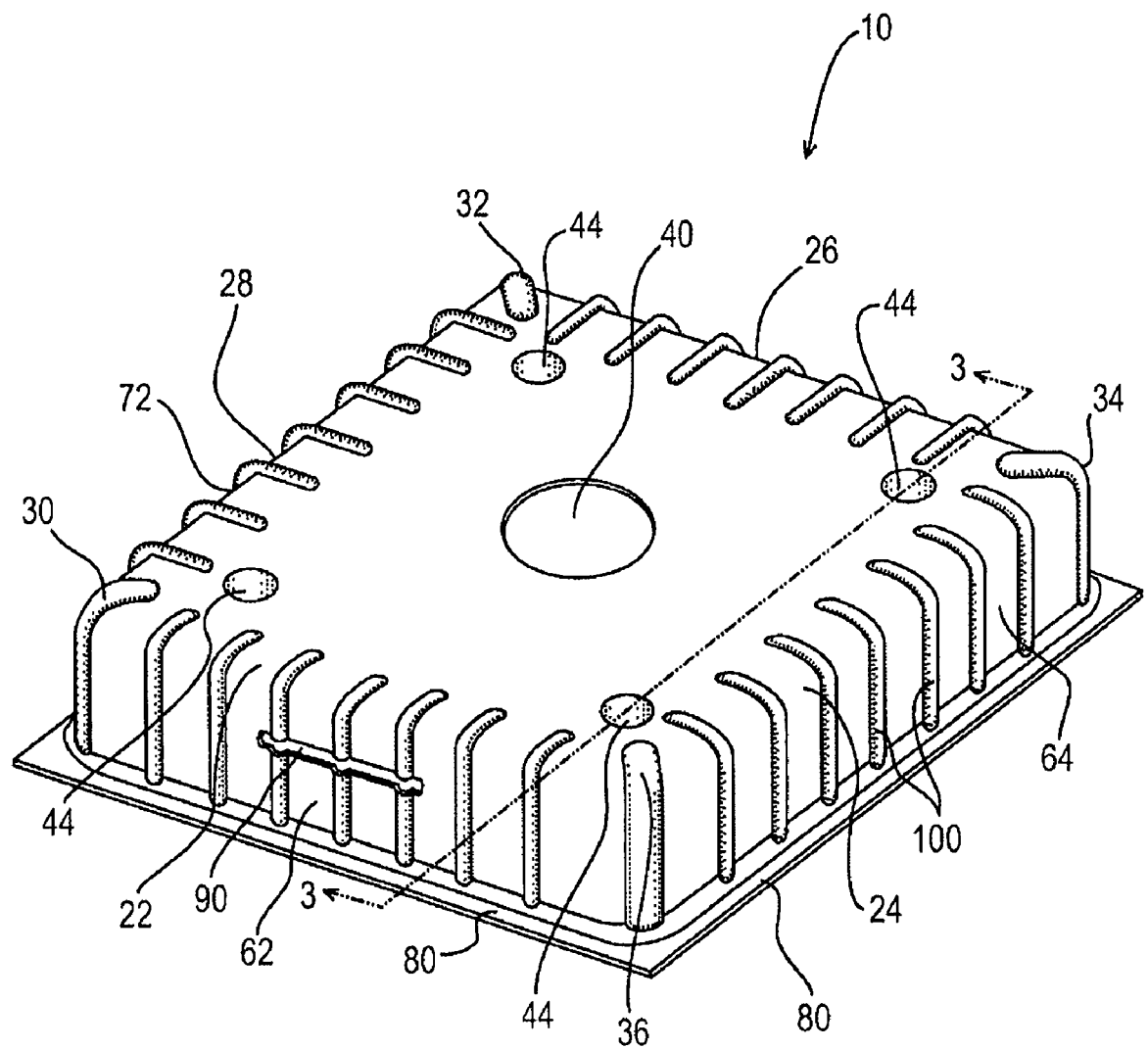
FIG. 2 is a perspective view of a top surface of the cube cover.

A cover 10 for a plant growing medium is shown in FIGS. 1 and 2. The cover 10 is constructed from a suitably rigid material such as plastic.

The cover 10 has a sheet 20. The sheet 20 may be of any shape or size so as to cover the surface or surfaces of a plant growing medium that are directly exposed to light sources of the type frequently used for indoor growing. In the embodiment shown in FIGS. 1 and 2, the sheet 20 is square. Preferably, the sheet is substantially planar. Further, the sheet 20 has four edges 22, 24, 26 and 28. The four edges 22, 24, 26 and 28 meet at four corners 30, 32, 34 and 36.

The sheet 20 defines an aperture 40. The aperture 40 may have any shape or size. In the embodiment shown in FIGS. 1 and 2, the aperture 40 is circular. The aperture 40 shown in FIGS. 1 and 2 is orientated at the centre of the sheet 20. It will be apparent to a person skilled in the art that it is not necessary for the aperture 40 to be orientated at the centre of the sheet 20. The aperture 40 may also be in a different position in the sheet 20 such as near one of the edges 22, 24, 26 or 28 of the sheet 20 or near one of the corners 30, 32, 34 or 36 of the sheet 20.

At least one protrusion projects from the sheet 20. In the embodiment shown in FIGS. 1 to 3, there are four protrusions 44 projecting from the sheet 20. It will be apparent to a person skilled in the art that the objects of the invention may be satisfied by any number of protrusions projecting from the sheet 20 and embodiments incorporating one or more protrusions are contemplated.

As seen in FIG. 1, each protrusion is barrel-shaped with bevelled walls. The bevelled walls of the protrusion may meet at a point (not shown). In the embodiment shown in FIGS. 1 and 2, each protrusion has a surface 60. Preferably, each of the surfaces 60 is parallel to the plane of the sheet 20. The protrusions are each orientated proximate to a separate corner of the sheet 20.

A preferred embodiment of the protrusions 44 is shown in FIGS. 1 and 2. Protrusions having other shapes and orientations are contemplated.

As seen in FIG. 2, each of the protrusions 44 is hollow. It will be apparent to a person skilled in the art that the objects of the invention may be achieved if the protrusions are solid and this is contemplated.

As seen in FIGS. 1 and 2, in a preferred embodiment of the cover, four walls 62, 64, 68 and 72 are integrally attached to edges 22, 24, 26 and 28, respectively. In the embodiment shown in FIGS. 1 to 3, each of the walls 62, 64, 68 and 72 is in a plane perpendicular to the plane of the sheet 20. Each of the walls 62, 64, 68 and 72 has a flange 80 at an end of the wall opposite to the end of the wall that is integrally attached to the sheet 20.

In a preferred embodiment, each of the walls 62, 64, 68 and 72 opposes one of the other walls.

As seen in FIG. 1, two of the opposing walls 62 and 68 define a slit 90. In a preferred embodiment, each of the slits 90 is elongated and positioned in the centre of the wall. Each of the slits 90 enhance the circulation of air proximate to the plant growing medium.

Each of the walls 62, 64, 68 and 72 has a number of ridges 100. Each of the ridges 100 extend from a point at which the flange 80 meets the walls 62, 64, 68 and 72 beyond a point at which the edges 22, 24, 26 and 28 of the sheet 20 meet the walls 62, 64, 68 and 72.

From the inside of the cover 10, each of the ridges 100 is convex or bowed outward. Further, the ridges 100 are parallel to one another and the ridges 100 other than the ridges 100 orientated where the walls 62, 64, 68 and 72 meet are equidistant from one another. Each of the slits 90 bisect one or more of the ridges 100.

Figure 3:
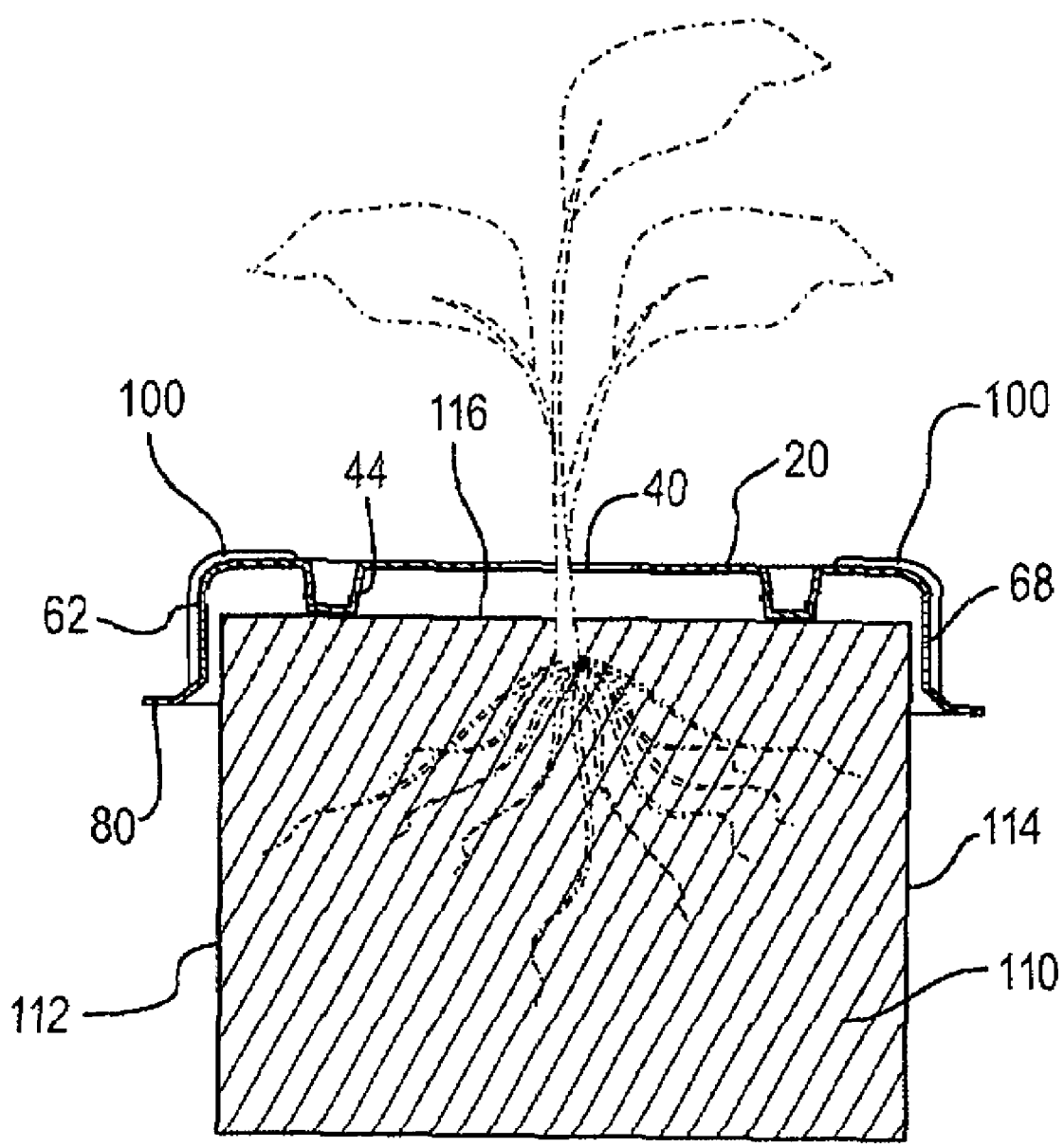
FIG. 3 is a sectional view of the cube cover along line 3-3 of FIG. 2.

As seen in FIG. 3, in operation, the cover 10 is placed upon a plant growing medium 110. The plant growing medium 110 can be any suitable medium for growing plants including soil and rockwool. The shape and dimensions of the cover 1 0 must be such that the cover 10 fits on the plant growing medium 110. Specifically, the distance between opposing walls 60 and 68 of the cover 10 must be greater than the distance between opposing walls 112 and 114 of the plant growing medium.

When the cover 10 is placed on the plant growing medium 110, the surface 60 of each protrusion engages a top surface 116 of the plant growing medium 110. For optimal performance, when the cover 10 is placed on the plant growing medium, none of the walls 62, 64, 68 or 72 of the cover 10 should engage the plant growing medium. In a preferred embodiment, each of the walls 62, 64, 68 and 72 is positioned in a plane parallel to a plane of the walls of the plant growing medium 110 upon placement of the cover 10 on the plant growing medium 110.

Numerous modifications may be made to the embodiment described above without departing from the scope of the invention which is defined by the claims.

I claim:

1. A device for covering a plant growing medium, comprising:
    a sheet, said sheet being substantially planar and lying substantially in a first plane;
    an aperture defined by said sheet, said aperture sized to permit a plant to grow therethrough; and
    at least one protrusion projecting in a first direction from said sheet for engaging a top surface of a plant growing medium, wherein said sheet has at least one sheet edge, and at least one of said at least one sheet edge has a cover wall connected thereto and projecting therefrom, wherein said at least one cover wall projects further into said first direction than said at least one protrusion and wherein said at least one protrusion has a lower surface for engaging a plant growing medium to support said device thereon, wherein said aperture in said sheet is spaced in said first direction away from said lower surface of said at least one protrusion, and
    wherein said at least one cover wall comprises a slit so as to enhance the circulation of air proximate to a plant growing medium when said device is placed on a plant growing medium.

2. The device of claim 1, wherein said sheet is square.

3. The device of claim 1, wherein said at least one protrusion consists of four protrusions and each of said protrusions is proximate to a separate corner of said sheet.

4. The device of claim 1, wherein said device can prevent growth of algae on a growing medium covered thereby.

5. The device of claim 1, wherein said sheet has four sheet edges, wherein each of said four sheet edges has a cover wall projecting therefrom in said first direction and at least one of said cover walls has a plurality of ridges and at least one of said ridges has a slit therein to enhance circulation of air.

6. The device of claim 1, further comprising a plant growing medium, said growing medium having a growing medium top surface, said growing medium top surface comprising at least one growing medium edge and a growing medium side wall meets each of said at least one medium edge, wherein said growing medium top surface has dimensions smaller than the dimensions of said sheet, wherein said device for covering a plant growing medium can be placed over said growing medium so that when said at least one protrusion engages said growing medium top surface said at least one cover wall will extend below said medium top surface and at least one of said at least one cover wall is spaced from at least one of said at least one growing medium side.

7. The device of claim 6, wherein said growing medium top surface has the same shape as said sheet, and wherein said growing medium is in the shape of a cube and said sheet is substantially planar and square in shape, said sheet having four edges and four cover walls projecting said sheet edges.

8. The device of claim 1, wherein said growing medium is rockwool.

9. The device of claim 7, wherein said growing medium is rockwool.

10. The device of claim 7, wherein said device can prevent growth of algae on said growing medium covered thereby.

11. A device for covering a plant growing medium, comprising:
    a sheet, said sheet being substantially planar and lying substantially in a first plane;
    an aperture defined by said sheet, said aperture sized to permit a plant to grow therethrough; and
    at least one protrusion projecting in a first direction from said sheet for engaging a top surface of a plant growing medium, wherein said sheet has at least one sheet edge, and at least one of said at least one sheet edge has a cover wall connected thereto and projecting therefrom, wherein said at least one cover wall projects further into said first direction than said at least one protrusion and wherein said at least one protrusion has a lower surface for engaging a plant growing medium to support said device thereon, wherein said aperture in said sheet is spaced in said first direction away from said lower surface of said at least one protrusion, wherein said sheet has four sheet edges and is square; and
    wherein said at least one protrusion consists of four protrusions and each of said four protrusions is proximate to a separate corner of said sheet.

12. The device of claim 11, wherein said device can prevent growth of algae on a growing medium covered thereby.

13. The device of claim 11, further comprising four cover walls wherein each said cover wall is integrally attached to a separate edge of said sheet and wherein each said cover wall is in a cover wall plane, each said cover wall plane intersecting said first plane, wherein two of said cover walls are opposing and said two opposing walls each comprise a slit so as to enhance the circulation of air proximate to a plant growing medium when said device is placed on a plant growing medium having top dimensions to fit within said device.

14. The device of claim 13, wherein each of said four cover walls has a plurality of ridges and at least one of said ridges on each of said two opposing walls is bisected by a said slit.

15. The device of claim 14, wherein said plurality of ridges on each of said four walls extends such that a portion of each said ridge is on said sheet.

16. The device of claim 11, further comprising a plant growing medium, said growing medium having a growing medium top surface, said growing medium top surface comprising at least one growing medium edge and a growing medium side wall meets each of said at least one medium edge, wherein said growing medium top surface has dimensions smaller than the dimensions of said sheet, wherein said device for covering a plant growing medium can be placed over said growing medium so that when said at least one protrusion engages said growing medium top surface said at least one cover wall will extend below said medium top surface and at least one of said at least one cover wall is spaced from at least one of said at least one growing medium side.

17. The device of claim 16, wherein said device can prevent growth of algae on said growing medium covered thereby.

18. The device of claim 17, wherein said growing medium is rockwool.

19. A device for covering a plant growing medium, comprising:
 a cover comprising a sheet, said sheet being substantially planar and lying substantially in a first plane;
 an aperture defined by said sheet, said aperture sized to permit a plant to grow therethrough; and
 at least one protrusion projecting in a first direction from said sheet for engaging a top surface of a plant growing medium, wherein said sheet has at least one sheet edge, and at least one of said at least one sheet edge has a cover wall connected thereto and projecting therefrom, wherein said at least one cover wall projects further into said first direction than said at least one protrusion and wherein said at least one protrusion has a lower surface for engaging a plant growing medium to support said device thereon, wherein said aperture in said sheet is spaced in said first direction away from said lower surface of said at least one protrusion,
and said device further comprises a plant growing medium, said growing medium having a growing medium top surface, said growing medium top surface comprising at least one growing medium edge and a growing medium side wall meets each of said at least one medium edge, wherein said growing medium top surface has dimensions smaller than the dimensions of said sheet, wherein said device for covering a plant growing medium can be placed over said growing medium so that when said at least one protrusion engages said growing medium top surface said at least one cover wall will extend below said medium top surface and at least one of said at least one cover wall is spaced from at least one of said at least one growing medium side.

20. The device of claim 19, wherein said sheet has four sheet edges, and wherein said at least one protrusion consists of four protrusions, and each of said protrusions is proximate to a separate corner of said sheet.

21. The device of claim 19, wherein said device can prevent growth of algae on a growing medium covered thereby.

22. The device of claim 20, further comprising four cover walls wherein each said cover wall is integrally attached to a separate edge of said sheet and wherein each said cover wall is in a cover wall plane, each said cover wall plane intersecting said first plane, at least one of said cover walls comprising a slit so as to enhance the circulation of air proximate to said plant growing medium when said device is placed on said plant growing medium.

23. The device of claim 22, wherein at least one of said four cover walls has a plurality of ridges and at least one of said ridges is crossed by a slit to enhance circulation.

24. The device of claim 23, wherein said plurality of ridges extends such that a portion of each said ridge is on said sheet.

25. The device of claim 19, wherein said growing medium top surface has the same shape as said sheet.

26. The device of claim 19, wherein said growing medium is rockwool said device can prevent growth of algae thereon.

* * * * *